US012194342B2

(12) United States Patent
Weinlader et al.

(10) Patent No.: US 12,194,342 B2
(45) Date of Patent: Jan. 14, 2025

(54) AUTOMATIC BALL MACHINE APPARATUS

(71) Applicant: Volley LLC, Lancaster, PA (US)

(72) Inventors: John Weinlader, Wilmette, IL (US);
Daniel Weinlader, Lititz, PA (US)

(73) Assignee: Volley LLC, Lancaster, PA (US)

( * ) Notice: Subject to any disclaimer, the term of this patent is extended or adjusted under 35 U.S.C. 154(b) by 669 days.

(21) Appl. No.: 17/408,147

(22) Filed: Aug. 20, 2021

(65) Prior Publication Data
US 2021/0379446 A1 Dec. 9, 2021

Related U.S. Application Data

(63) Continuation-in-part of application No. 17/093,321, filed on Nov. 9, 2020, now abandoned.
(Continued)

(51) Int. Cl.
*A63B 24/00* (2006.01)
*A63B 61/00* (2006.01)
(Continued)

(52) U.S. Cl.
CPC .......... *A63B 24/0021* (2013.01); *A63B 61/00* (2013.01); *G06V 20/42* (2022.01); *G06V 40/23* (2022.01); *A63B 2024/0025* (2013.01); *A63B 2024/0028* (2013.01); *A63B 2243/0095* (2013.01)

(58) Field of Classification Search
CPC ............... A63B 24/0021; A63B 61/00; A63B 2024/0025; A63B 2024/0028; A63B 2243/0095; A63B 2071/068; A63B 2220/05; A63B 2220/30; A63B 2220/806; A63B 2220/808; A63B 2220/89; A63B 2225/20; A63B 2225/50; A63B 69/40; A63B 71/0619; G06V 20/42; G06V 40/23
See application file for complete search history.

(56) References Cited

U.S. PATENT DOCUMENTS 5,816,953 A 10/1998 Cleveland
6,539,931 B2 4/2003 Trajkovic et al.
(Continued)

FOREIGN PATENT DOCUMENTS

CN 110538443 A 12/2019
KR 102265914 B1 * 6/2021
(Continued)

*Primary Examiner* — Jeffrey S Vanderveen
(74) *Attorney, Agent, or Firm* — Muir Patent Law, PLLC (57) ABSTRACT

A method and automatic ball machine comprise an imaging system, a ball launching system, a mobility system, and a controller. The imaging system produces image data related to an environment of the automatic ball machine including a player to receive a ball. The ball launching system launches the ball to place the ball at a location proximate to the player. The mobility system automatically moves the automatic ball machine about the environment to change a trajectory of the ball based on the image data. The controller detect a location of the automatic ball machine relative to the environment based on the image data, adjust the ball launching system to place the ball at the location proximate to the player based on the image data, and control the mobility system to automatically move the automatic ball machine about the environment based on the image data.

20 Claims, 11 Drawing Sheets

Related U.S. Application Data

(60) Provisional application No. 62/933,497, filed on Nov. 10, 2019.

(51) Int. Cl.
    *G06V 20/40*    (2022.01)
    *G06V 40/20*    (2022.01)

(56) References Cited

U.S. PATENT DOCUMENTS

| | | |
|---|---|---|
| 8,419,560 B2 | 4/2013 | Amini |
| 9,233,294 B1 | 1/2016 | Coyle |
| 10,695,644 B2 | 6/2020 | Khazanov et al. |
| 11,033,780 B2 * | 6/2021 | New .................... G05D 1/0246 |
| 11,367,364 B2 | 6/2022 | May |
| 11,657,906 B2 * | 5/2023 | Lewis ................ A63B 24/0075 |
| | | 124/78 |
| 2013/0130845 A1 * | 5/2013 | Marty .................... G06V 40/23 |
| | | 473/459 |
| 2015/0165300 A1 * | 6/2015 | Vaught ................ A63B 69/408 |
| | | 473/459 |
| 2019/0126120 A1 | 5/2019 | Paredes et al. |
| 2020/0197782 A1 | 6/2020 | Abdelmoneum et al. |
| 2021/0128989 A1 * | 5/2021 | Legg .................... G05D 1/0094 |
| 2022/0198368 A1 | 6/2022 | May |

FOREIGN PATENT DOCUMENTS

| | | |
|---|---|---|
| WO | 2022038587 A1 | 2/2022 |
| WO | 2022050792 A1 | 3/2022 |

\* cited by examiner

AUTOMATIC BALL MACHINE APPARATUS

CROSS-REFERENCE TO RELATED APPLICATION

This application is a continuation-in-part of U.S. patent application Ser. No. 17/093,321 filed Nov. 9, 2020, entitled "Ball Machine Apparatus", which claims priority from U.S. Patent App. Ser. No. 62/933,497 filed Nov. 10, 2019, entitled "Ball Machine Apparatus", the entire specification of each of which are hereby incorporated by reference in their entireties.

BACKGROUND OF THE DISCLOSURE

1. Field of the Disclosure

The disclosure relates in general to a ball machine apparatus, and more particularly, to an automatic ball machine apparatus.

2. Background Art

Ball machines, such as those used for projecting, for example, tennis balls at a tennis player or baseballs at a batter in a batter's box, are very helpful in practicing hitting tennis balls and hitting baseballs. Typically, these machines have speed control knobs that allow an operator to adjust various motors and actuators to "dial-in" a ball launch that the player wants to practice. This "dial-in" practice is time consuming and cumbersome.

Additionally, in many instances it is difficult to vary the type of projection of a ball and the placement on a predetermined, random or other controlled manner. Some devices allow for manual feed and adjustment. Others allow for a couple of different predetermined shots, or volleys. The formed is difficult because it requires multiple individuals and cannot be done alone. The latter has other issues such as predictability or very few options. Moreover, the latter lacks feedback to see the result of the output, or the like.

The disclosure herein is not limited to tennis ball volleys and the hitting of baseballs, but can be modified for any number of different types of balls for different types of sports, including, for example, and not limited to, soccer, football, softball, table tennis, badminton, among others.

SUMMARY OF THE DISCLOSURE

The disclosure is directed to an automatic ball machine comprising an imaging system, a ball launching system, a mobility system, and a controller. The imaging system produces image data related to an environment of the automatic ball machine including a player to receive a ball. The ball launching system launches the ball to place the ball at a location proximate to the player. The mobility system automatically moves the automatic ball machine about the environment to change a trajectory of the ball based on the image data. The controller detect a location of the automatic ball machine relative to the environment based on the image data, adjust the ball launching system to place the ball at the location proximate to the player based on the image data, and control the mobility system to automatically move the automatic ball machine about the environment based on the image data.

In at least one configuration, the imaging system includes at least one of a first camera facing in a direction that the ball is launched, a second camera facing in a direction to a left of the launch direction, a third camera facing to a right of the launch direction, and a fourth camera facing to away from the launch direction.

In at least one configuration, the ball launching system includes first, second, and third spinner wheels coupled to first, second, and third spinner motors.

In at least one configuration, the automatic ball machine further comprises an environmental sensor to detect objects in a direction that the ball is being launched, and the controller monitors an area in the direction that the ball is being launched and stops the ball launching system from launching the ball to prevent an object from being struck by the ball.

In at least one configuration, the environmental sensor is LiDAR.

In at least one configuration, the controller further receives at least one of user serve preference and location on a court, calculates serving parameters based on the at least one user serve preference and location on the court, and adjusts the ball launching system based on the user serve preference and location on the court.

In at least one configuration, the ball machine further comprises an orientation sensor to detect an orientation of the ball and an orientation adjuster to rotate the ball.

In at least one configuration, the automatic ball machine further comprises a height actuator to adjust a height of the ball launching system.

In at least one configuration, the automatic ball machine further comprises a hopper to store a quantity of balls prior to launch.

In at least one configuration, the automatic ball machine further comprises a ball feeder to control, via the controller, feeding of the ball to the ball launching system.

The disclosure is directed to a method comprising producing, by an imaging system, image data related to an environment of the automatic ball machine including a player to receive a ball, and launching, by a ball launching system, the ball to place the ball at a location proximate to the player. The method further comprises detecting, by a controller, a location of the automatic ball machine relative to the environment based on the image data, and adjusting, by the controller, the ball launching system to place the ball at the location proximate to the player based on the image data. The method yet further comprises controlling, by the controller, the mobility system to automatically move the automatic ball machine about the environment based on the image data, and automatically moving, by a mobility system, the automatic ball machine about the environment to change a trajectory of the ball based on the image data.

In at least one configuration of the method, the imaging system includes at least one of a first camera facing in a direction that the ball is launched, a second camera facing in a direction to a left of the launch direction, a third camera facing to a right of the launch direction, and a fourth camera facing to away from the launch direction.

In at least one configuration of the method, the ball launching system includes first, second, and third spinner wheels coupled to first, second, and third spinner motors.

In at least one configuration of the method, the method further comprises detecting, by an environmental sensor, objects in a direction that the ball is being launched, monitoring, by the controller, an area in the direction that the ball is being launched, and stopping, by the controller, the ball launching system from launching the ball to prevent an object from being struck by the ball.

In at least one configuration of the method, the environmental sensor is a Light Detection and Ranging (LiDAR) sensor.

In at least one configuration of the method, the method further comprises receiving, by the controller, at least one of user serve preference and location on a court, calculating, by the controller, serving parameters based on the at least one user serve preference and location on the court, and adjusting, by the controller, the ball launching system based on the user serve preference and location on the court.

In at least one configuration of the method, the method further comprises detecting, by an orientation sensor, an orientation of the ball, and rotating, by an orientation adjuster, the ball.

In at least one configuration of the method, the method further comprises adjusting, by a height actuator, a height of the ball launching system.

In at least one configuration of the method, the method further comprises storing, by a hopper, a quantity of balls prior to launch.

In at least one configuration of the method, the method further comprises controlling, via the controller, a ball feeder to feed the ball to the ball launching system.

BRIEF DESCRIPTION OF THE DRAWINGS

The disclosure will now be described with reference to the drawings wherein.

DETAILED DESCRIPTION OF THE DISCLOSURE

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1-9, an apparatus is disclosed, such as an automatic ball machine 100 that includes a frame 105 onto which various components are coupled, such as a controller 110, an imaging system 120 including at least one environmental sensor to detect an environment around the automatic ball machine 100, such as a camera 121 disposed on a front of the automatic ball machine 100 to capture images in a direction in which balls 101 are launched, a ball launching system 130 to launch the balls 101, in at least one configuration a hopper 135 to store a quantity of the balls 101 prior to launch, and a mobility system 175 to move the ball machine 100. The ball machine 100 is shown in a lowered position in FIGS. 1-8 and in a raised position in FIG. 9. However, the ball machine 100 can be positioned anywhere in-between the lowered position and the raised position depending upon the trajectory needed to launch the balls 101 by the ball launching system 130. The ball machine 100 can further include a ball feeder 137 to control, via the controller 110, feeding of balls 101 to the ball launching system 130, such as from the hopper 135.

In at least one configuration, the imaging system 120 includes multiple cameras to improve the data that is being received by the controller 110. For example, the ball machine 100 can include at least one of a first camera 121 facing in a direction that the balls 101 are being launch, and second, third, and fourth cameras 122, 123, 124 to detect objects to a left of the launch direction, to a right of the launch direction, away from the launch direction, respectively. The controller 110 can use these additional cameras to generate extra information that assists the controller 110 to determine an internal physical model of a space and/or performing recognition tasks on images captured by the cameras, as discussed below. These multiple cameras can increase an effective field-of-view of the of the imaging system 120. In at least one configuration, the imaging system 120 includes stereo cameras positioned a few inches apart (like eyes) to detect depth. In still another configuration, the camera 121 is a Time-Of-Flight (TOF) camera to detect a depth of field. In at least one configuration, such as for sports like Tennis and Paddle, additional cameras can be disposed about a court, as well as the ball machine 100 to capture data from various viewpoints during actual gameplay. In at least one configuration, the ball machine 100 can further include secondary sensor(s), such as a radar sensor (e.g. Light Detection and Ranging (LiDAR) sensor) or similar, to detect objects outside a field-of-view of the imaging system 120, and/or to provide backup data for the controller 110.

The ball launching system 130 can include a plurality of spinner wheels coupled to a plurality of motors, to launch the balls 101. For example, the ball launching system 130 can include first, second, third spinner wheels 132a, 132b, 132c, coupled to first, second, third spinner motors 134a, 134b, 134c, respectively. In the configuration shown, the spinner wheel 132a/spinner motor 134a is shown as being disposed substantially at approximately (+−5 degrees) the 12 o'clock position, with the spinner wheel 132c, spinner motor 134c being disposed at approximately (+−5 degrees) the 4 o'clock position, and the spinner wheel 132b, spinner motor 134b being disposed at approximately (+−5 degrees) the 8 o'clock position.

In at least one configuration, the automatic ball machine 100 further includes another type of environmental sensor, such as a LiDAR sensor 159 to detect objects in a direction that balls 101 are being launched, although additional LiDAR sensors are possible to detect objects in the other three directions around the automatic ball machine 100. The automatic ball machine 100 can use the LiDAR sensor 159 to monitor, via the controller 110, an area in a direction that the ball 101 is being launched, and in at least one configuration around the automatic ball machine 100 to ensure no objects, such as no people or other objects will be struck by the balls 101 being launched by the automatic ball machine 100, or harmed by any automated mechanical movement of the automatic ball machine 100. The automatic ball machine 100 establishes a keep-out region, that if violated, will result in the automatic ball machine 100 stopping launching of the balls 101 and/or mechanical movement, such as the ball launching system 130, and in at least one configuration issuing a warning to a player or user 102. The automatic ball machine 100 can adjust a distance the keep-out region extends from the automatic ball machine 100, such as based on a court location of the automatic ball machine 100. The coverage area around the automatic ball machine 100 is dependent on the number of sensors used. In the simplest configuration, a single sensor, such as the LiDAR sensor 159, can be faced forward along a path of the balls 101, while in other configurations a full 360-degree coverage around the automatic ball machine 100 can be implemented via additional LiDAR sensors.

The controller 110 can use the imaging system 120 to detect objects in a field of vision of the imaging system 120 to determine where in a space (e.g., court, field . . . ) the ball machine 100 is located. With the controller 110 having the ability to know its location relative to this space allows the controller 110 to individually adjust a speed of the spinner wheels 132a, 132b, 132c to place the balls 101 in an acceptable location for the recipient player 102. For example, the player or user 102 can wheel the ball machine 100 onto a court and use a control panel 112 (e.g., touch-screen) and/or a remote wireless device 151 via a network 1900 (FIG. 10), such as a smartphone, to indicate where the user 102 wants a ball 101 placed. The controller 110 makes the appropriate calculations, by solving a ball flight equation, to determine a speed and flight path needed to launch the ball 101 to place the ball 101 at the acceptable location for the recipient player 102.

For example, the automatic ball machine 100 can allow the user 102 to practice a particular serve type and location on a court. In this example, the user 102 can enter their serve preference and/or location on the court into the controller 110. Then, the camera 121, or cameras 121-124, captures an image(s) of the court from the perspective of the automatic ball machine 100, and the controller 110 can execute software that calculations a location (e.g. x, y, z, yaw, pan, tilt) of the automatic ball machine 100 based on the image(s) captured by the camera 121, or cameras 121-124. The controller 110 can further execute software to calculate serving parameters (e.g., ball speed, ball spin, tilt, pan) based on the serve preference and/or location entered by the user 102 and the computed location of the automatic ball machine 100, and adjust the ball launching system 130 and a height actuator 145 to accurately launch the ball 101 to the desired location based on the user serve preference and/or location on the court.

The controller 110 can further use the imaging system 120 to dynamically adjust a speed of the spinner wheels 132a, 132b, 132c, such as adjustments of based on previous launched ball(s) 101. Some typical ball machines have motorized wheels that allow these ball machines to move about a tennis court. A common problem with this type of ball machine is that the wheels attached to the motors will wear over time and, as a result, flight of the balls will change over time. For example, with a new ball machine, a spinner motor coupled to a spinner wheel running at half speed may launch the ball 60 ft. But, with worn spinner wheels and the spinner motor running at half speed, the ball might only be launched 56 ft because of a change of trajectory. Such changes in trajectory can also be caused by wear in frame components, wear in bearings of the spinner wheels and/or spinner motors, and/or wear in any other components of the ball machine. The controller 110 can further use the imaging system 120 to determine the location of the ball 101 after being launched and determine if the ball 101 does not end up at the desired location, that is determine a location error. The controller 110 can dynamically adjust or calibrate a speed of the spinner wheels 132a, 132b, 132c to compensate for this location error such that a next ball(s) 101 will be launched to the desired location. This process can be performed continuously, such that the controller 110 is continuously determining if location error exists for a ball launch, and continuously compensating for this location error.

The controller 110 can further use the imaging system 120 for safety. With the ball machine 100 launching the ball 101 in excess of 100 mph, someone could get seriously injured if they were hit unexpectedly by such a launched ball 101. The controller 110 can use a field of vision of the imaging system 120 to detect if the ball's 101 flight is obstructed by an object, such as a person walking in front of the ball machine 100. The controller 110 can withhold launching of the ball 101 as a safety measure to avoid hitting the object. Thus, by utilizing a field of vision of the imaging system 120, if the controller 110 detects anyone (or anything) that is unexpected, the controller 110 can withhold/avoid throwing the ball 101 as a safety measure. For example, imagine someone walking across a baseball field and unknowingly walk into the flight path of a pitch. The ball machine 100 can dynamically stop the first, second, third spinner wheels 132a, 132b, 132c to prevent the ball from being launched. For example, the ball machine 100 will not throw a 100-mph fastball at a kid on a little league field who walks in front of the ball machine 100, or in a batting cage while players 102 are switching out.

The controller 110 can further use the imaging system 120 to adapt launching based on a particular user 102. For example, the ball machine 100 can make a responsive shot that would be representative of an opponent, for the person using it. Typically, all actions start with ball machines launching a ball. If a user 102 wants to practice hitting a follow-up shot to a tennis serve, it is impossible with typical ball machines. The ball machine 100 can be placed where a typical service returner would stand. When the player 102 serves, the controller 110, via the imaging system 120, can identify a ball 101 flight and speed of the serve and make a representative return shot. In at least one configuration, the ball machine 100 further includes a height actuator 145 to adjust a height of the ball launching system 130, which results in a more realistic release point for the ball 101 thereby changing the ball's 101 trajectory. The representative return shot includes timing the return ball 101 so it coincides, time wise, with a return, the controller 110 adjusting, via the height actuator 145, a height of the ball launching system 130 so an ejection point is at an appropriate height of where a returner would hit it, and adjusting a speed at which the ball launching system 130 launches a return shot that would be representative of one that a returner could hit. For example, a slow, low serve typically cannot be driven back at the player 102, the return pace being limited. But a hard hit serve, with a high bounce, can be returned at a much faster rate. The ball machine 100 can make adjustments based on these types of serve coming at it.

The controller 110 can further use the imaging system 120 to detect a visual indication in a field of sight of the imaging system 120 to trigger the ball 101 being thrown. The controller 110 can detect and understand basic player 102 positioning and determine when the player 102 is ready to receive the ball 101. The controller 110 can then trigger the ball launching system 130 to launch the ball. Typical ball machines send balls either by a coach directly feeding them into the ball machine or based on a timer (e.g., one ball every 10 seconds). For example, the ball machine 100 can wait until a batter is detected as standing in a batter's box and assuming a position indicating that the batter is ready to hit. Once the ball machine 100 detects the player 102 in a crouched position with a bat in a ready position, the ball machine 100 can launch or "pitch" the ball 101. In another example, for tennis the ball machine 100 will not serve a ball 101 until the ball machine 100 detects the player 102 in a service return position. Alternatively, the visual indicator that the ball machine 100 detects to trigger a ball 101 launch does not have to be sport specific, it can also be customized, for example the player could tap their head to trigger launch of a ball 101.

The controller 110 can further use the imaging system 120 to detect a location of the player 102 receiving the ball 101. This allows the ball machine 100 to dynamically place the ball 101 relative to the player 102 to practice different shots, regardless of where they are starting from. Typical ball machines just repeat the same shot. If the player 102 desires to practice a wide backhand 4' away, the player 102 practicing can "cheat" and when they reset, they drift closer to where the ball flight will be. The ball machine 100 can consistently place the ball 101 4' wide of the player 102, regardless of where the player 102 is standing. Thus, the player 102 drifting in their setup will have a benefit of being launched the ball 101 that is 4' away regardless of where they drift to, leading to be a better, more consistent, practice experience.

The controller 110 can further use the imaging system 120 to track return flight of the ball 101 from the player 102 and provide ball 101 flight analytics on a practice session. Typical practice sessions using a typical ball machine do not yield performance data on performance of the player 102. The player 102 cannot measure their performance from hitting balls launched by the typical ball machine. Using the above scenario, the player 102 practicing a backhand 4' away, the player 102 can receive a report from the ball machine 100 after their practice session that details their performance. For example, the ball machine 100 can detail how and how many balls 101 are returned, average speed of the returned balls 101, where did the return balls 101 go, an any another other analytic information from their practice session that is beneficial to the player 102.

The controller 110 can further use the imaging system 120 to learn aspects of the games they are helping to train. This can include a starting position of the player(s) 102, a size and layout of a court, scenarios for common responsive shots, etc. For example, if a soft serve is low, the tennis trainer would know the possible returns and provide one accordingly, with only a certain set of shots that are possible. In another example, if the player 102 serves and rushes the net, the ball machine 100 can lob the ball 101 over the player's 102 head instead of driving it past them.

In at least one configuration, the controller 110 includes a regenerative charging circuit 114. The controller 110 performs dynamic braking, via the regenerative charging circuit 114, of the spinner wheels 132a, 132b, 132c to rapidly change their speeds to exact RPMs. Typical ball machines will coast when a user changes its dial settings, e.g., if the typical ball machine goes from a speed of 100% to 50% it takes a very long time for the motor to "settle". In the dynamic braking process, excess kinetic energy is captured/harvested and stored in a battery 125 via the regenerative charging circuit 114. This dynamic braking process allows the controller 110 to rapidly change the speed of the first, second, third spinner motors 134a, 134b, 134c to set exact speeds to hit desired ball 101 flight paths, without consuming excess electrical energy, as energy consumption is important during battery 125 operation. In at least one configuration, the ball machine 100 can further communicate with a Bluetooth® Low Energy (BLE) switch that is coupled to an end of a racquet or bat (e.g., the BLE switch can be used to record swing trajectory). This BLE switch can be used to trigger the regenerative charging circuit 114 to minimize energy consumption of the ball machine 100.

The ball machine 100 can further include an orientation sensor(s) 165 to determine an orientation of the ball 101 as it is being fed into the ball launching system 130. The ball machine 100 can even further include an orientation adjuster 167 (e.g., at least one wheel/motor combination) to rotate the ball 101 accordingly so that the ball machine 100 can use consistent orientation on every ball 101 being fed into the ball launching system 130. Typical machines have random feeders or a person has to manually feed the ball at a specific orientation to get a desired output. Certain baseball flight paths perform differently based on the orientation of the seams. With random ball feed, output is random. With the ball machine 100 orienting the ball 101 in a consistent manner, this results in a more consistent flight path of the ball 101.

In at least one configuration, the ball machine 100 further includes a microphone 155 that allows the ball machine 100 to be controlled by verbal commands. The controller 110 can receive sound data from the microphone 155 and convert that sound data into the verbal commands. For example, when the player 102 is getting a lesson, the ball machine 100 can be easily started and stopped to allow the user 102 to get instruction(s). Typically, this can be done with a phone app, but using a phone app is inconvenient in that the phone must be carried in the player's 102 pocket while training. The ball machine 100 makes this process more convenient, for example the player 102 could say "Volley Stop" or "Volley Start". In at least one configuration, the ball machine 100 can be "named" by the player 102, such that a plurality of ball machines 100 can differentiated when players give commands. For example, the ball machines 100 could be named after actual tennis players, such as Williams, Sampras, Djokovic, or any other actual tennis player. In at least one configuration, the ball machine 100 can establish a data connection between a player device (e.g., phone, headset, etc.) to improve accuracy of perceived commands given to the ball machine 100 from the player device. This would prevent triggering another machine ball 100 on a next court.

In at least one configuration, the ball machine 100 can communicate with another ball machine 100. For example, the ball machines 100 can be placed to get a more realistic training experience. The ball machines 100 communicate with one another and determine which ball machine 100 that would be the most realistic ball machine 100 to respond. The ball machines 100 coordinating with each other to determine which specific ball machine 100 will respond to a particular ball 101 being hit toward the ball machines 100. Typically, a single trainer is limited in their placement on a court. For example, if a ball 101 is hit wide, but the ball machine 100 is located in a middle of the court, the return will be from the middle of the court. Thus, several machines 100 can be placed on a court (e.g., three across the baseline in tennis) and when the player 102 hits a wide shot, the ball machine 100 closest will be the one to return a ball 101. This would allow the player 102 to play a virtual match against a series of ball machines 100, and have the play be realistic.

In at least one configuration, the ball machine 100 can also include the mobility system 175 to move the ball machine 100 during use, such as for more realistic play. The mobility system 175 can include wheel/motor combinations, such as those shown. In the configuration shown, four such wheel/motor combinations 176-179 are shown coupled to the frame 105, with other configurations using more or less such wheel/motor combinations for mobility of the ball machine 100. The ball machine 100 can move about a court to position itself for a more realistic return shot. Since the imaging system 120 allows the ball machine 100 to know its location within its space, the ball machine 100 can move within that space and provide shots from different angles. Typical ball machines 100 are static in their placement. If the player 102 wants to practice a specific shot in tennis, such as a deep baseline forehand, the player 102 much move the typical ball machine accordingly. The player 102 would then hit a few balls, then go move the typical ball machine, recalibrate, hit a few more, then go move the typical ball machine to a new location, recalibrate, etc. The ball machine 100 allows the player 102 to identify a shot placement they desire to hit, and the ball machine 100 moves on the court to provide different angles and speeds that would be representative of those types of shots. For example, the ball machine 100 could start at the baseline, and move to the ad box to give the player 102 practice with different angles and speeds to practice their backhand.

Figure 1:
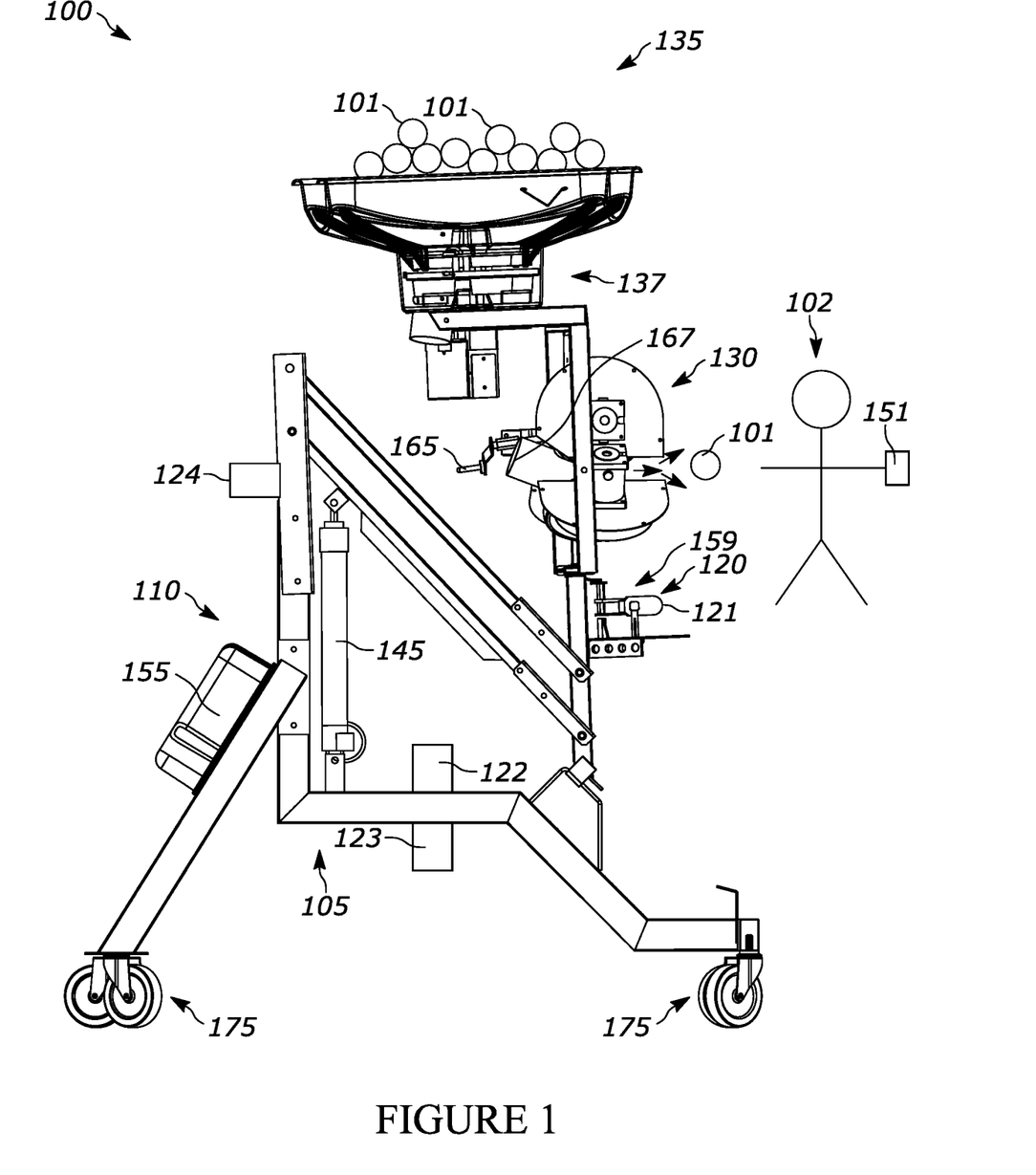
FIG. 1 illustrates a top view of an example automatic ball machine, in accordance with at least one configuration disclosed herein.
Figure 2:
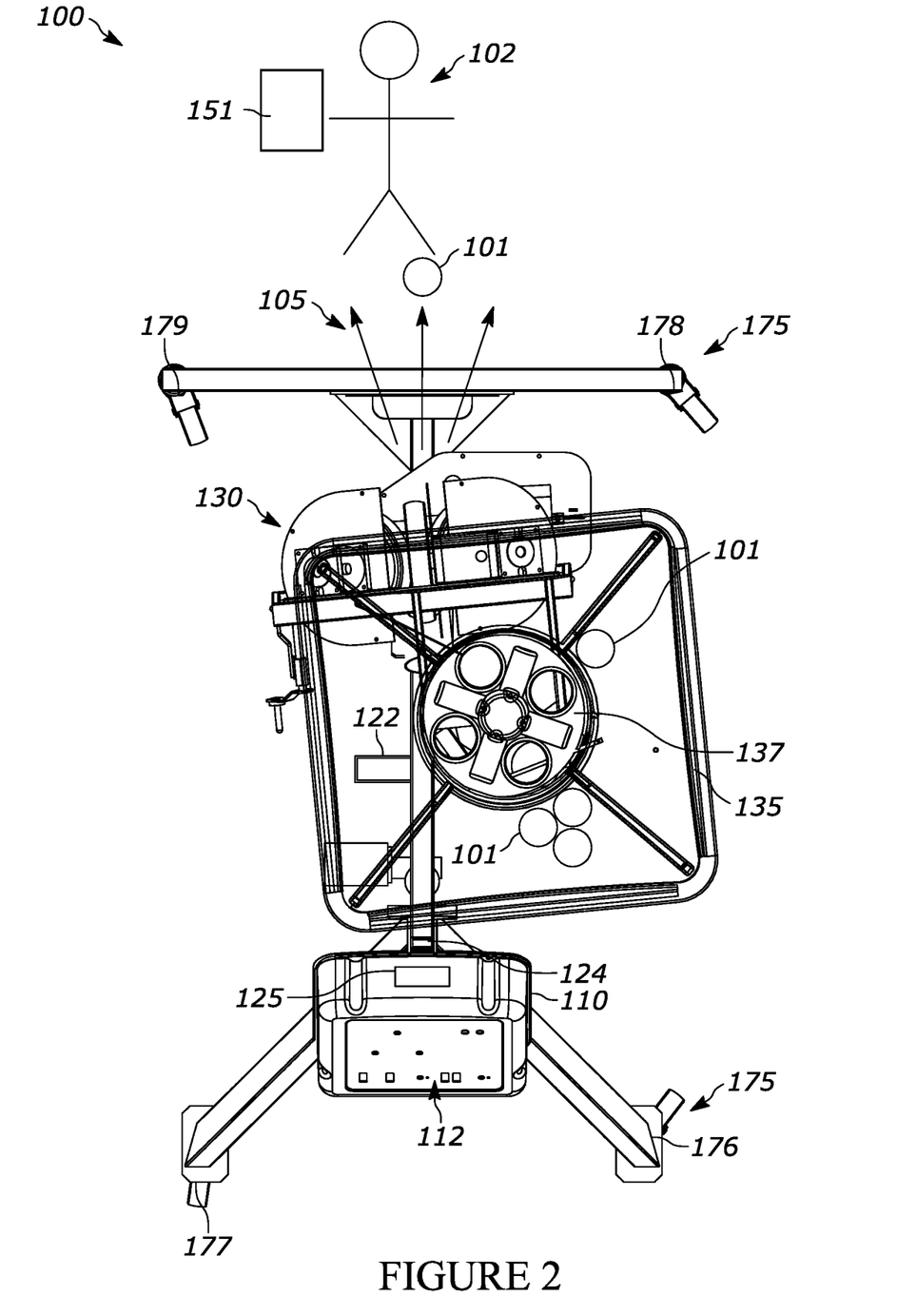
FIG. 2 illustrates a right-side view of the example automatic ball machine shown in FIG. 1, in accordance with at least one configuration disclosed herein.
Figure 3:
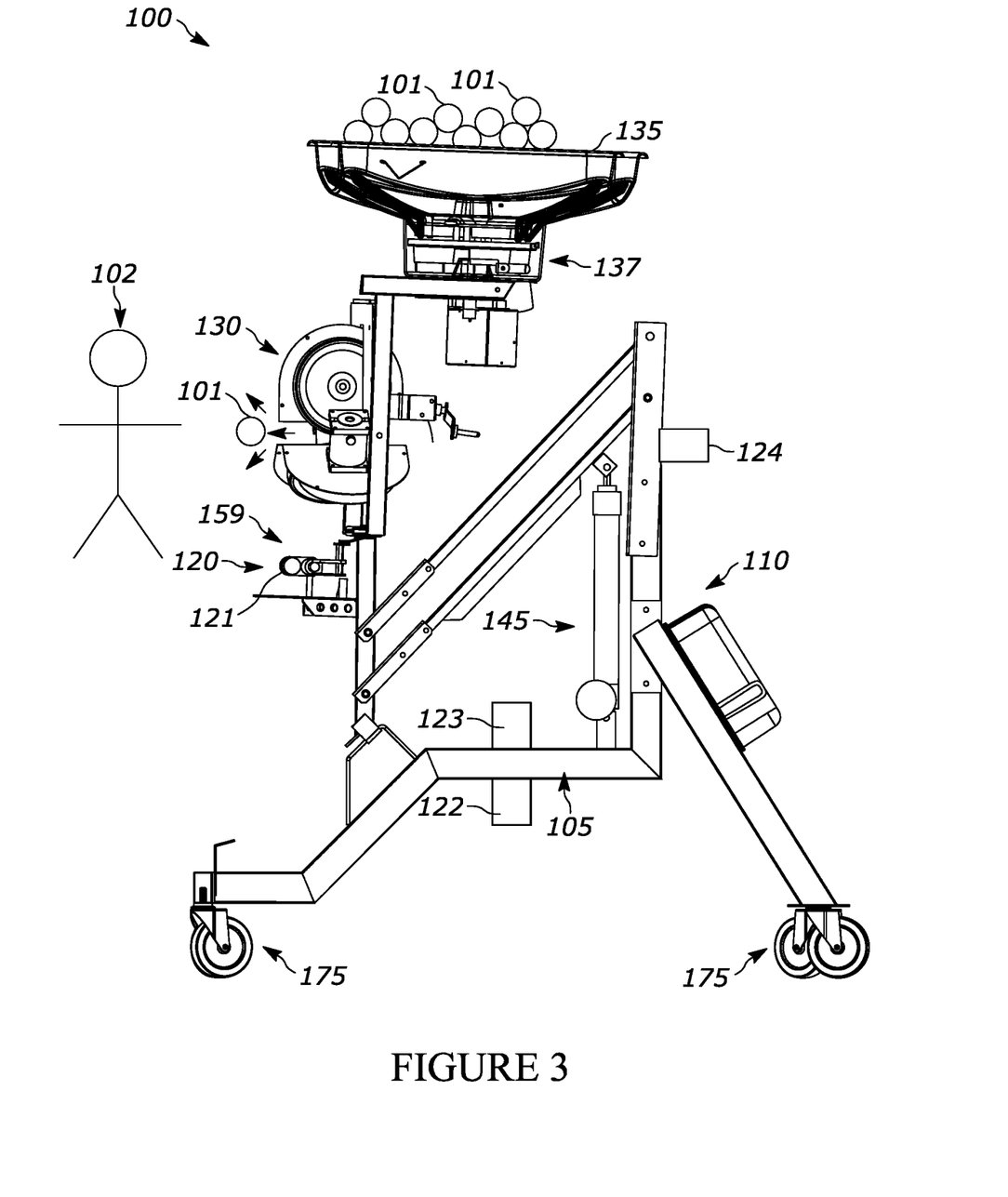
FIG. 3 illustrates a left side view of the example automatic ball machine shown in FIG. 1, in accordance with at least one configuration disclosed herein.
Figure 4:
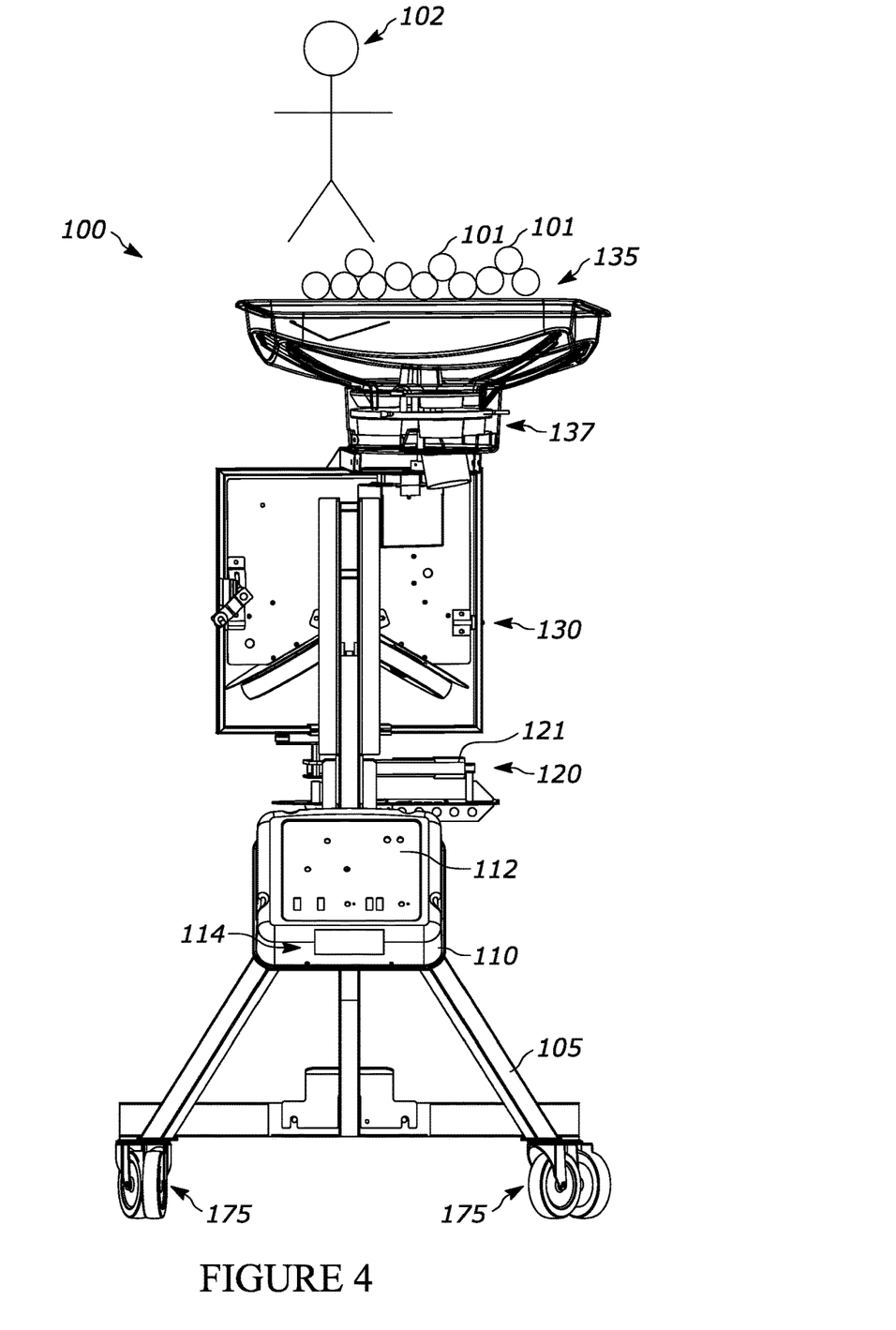
FIG. 4 illustrates a front side view of the example automatic ball machine shown in FIG. 1, in accordance with at least one configuration disclosed herein.
Figure 5:
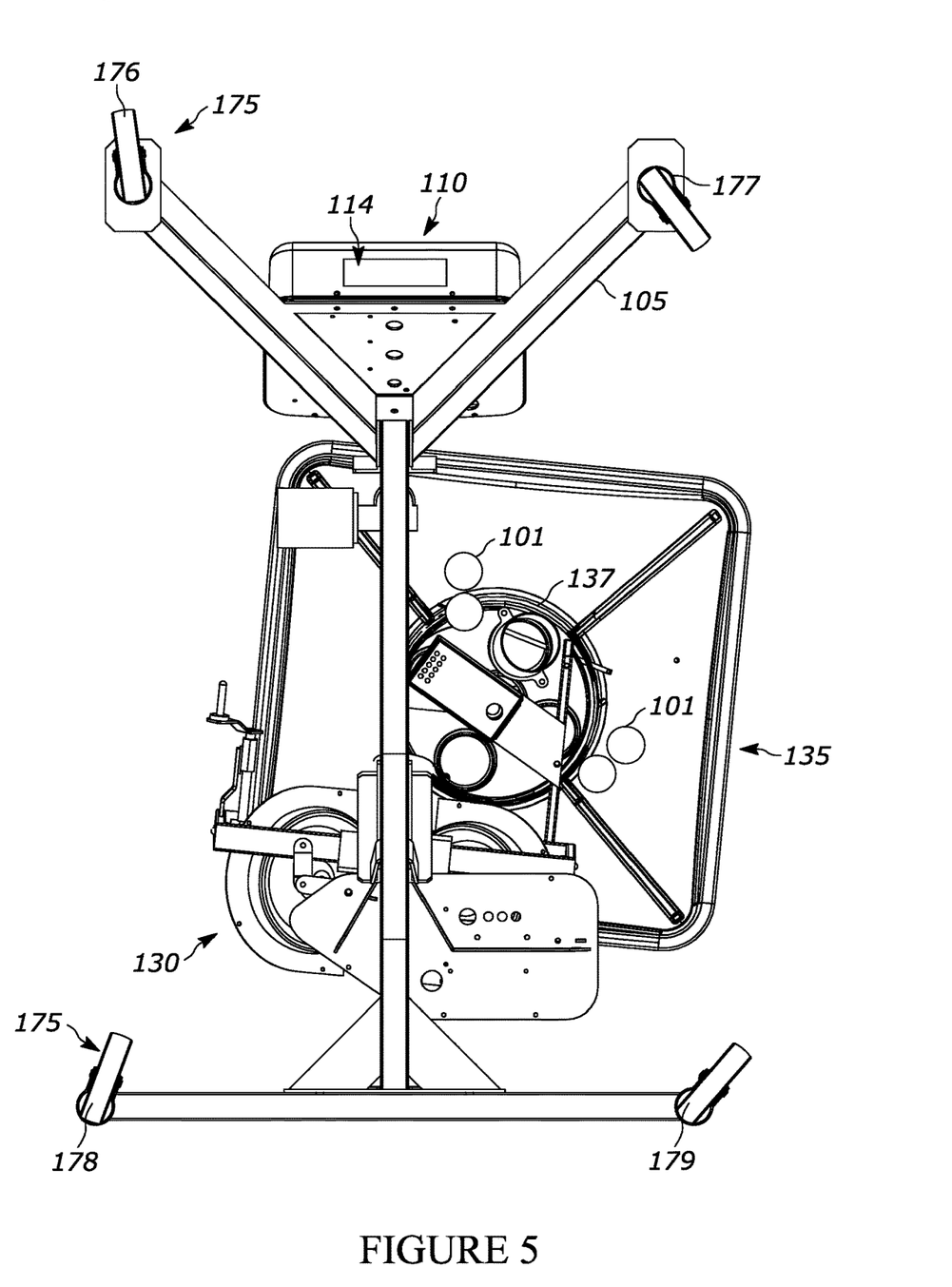
FIG. 5 illustrates a bottom view of the example automatic ball machine shown in FIG. 1, in accordance with at least one configuration disclosed herein.
Figure 6:
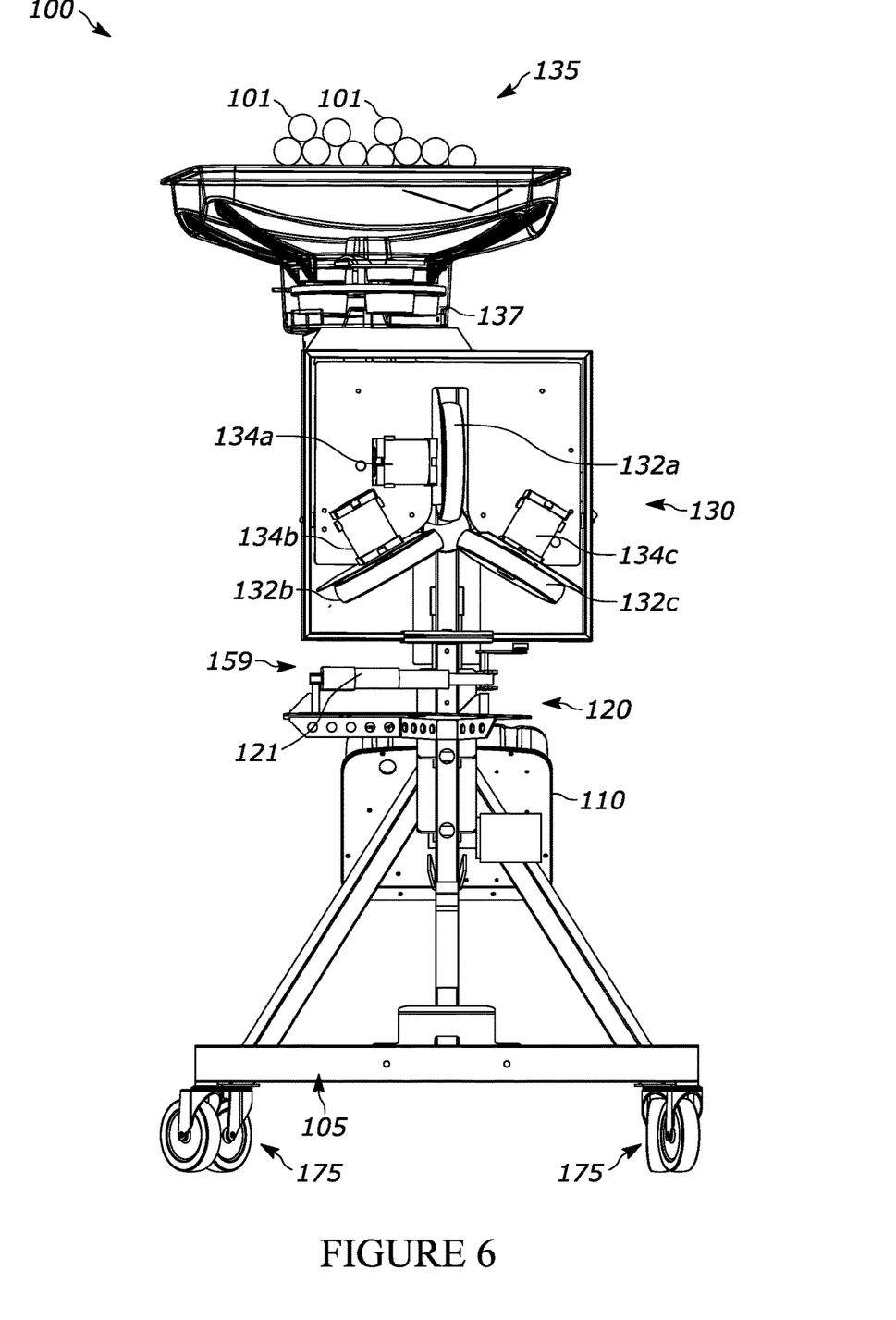
FIG. 6 illustrates a back-side view of the example automatic ball machine shown in FIG. 1, in accordance with at least one configuration disclosed herein.
Figure 7:
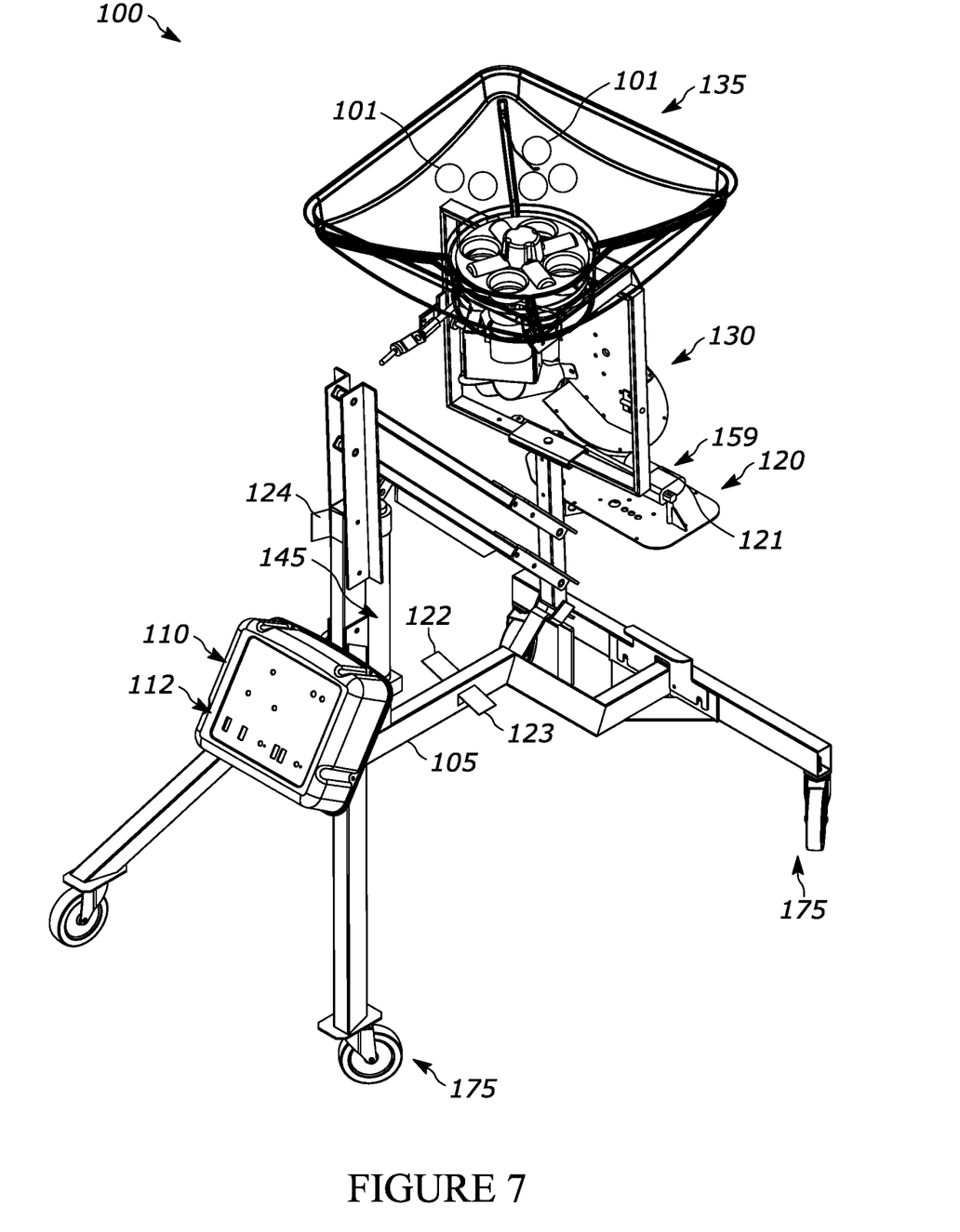
FIG. 7 illustrates an isometric view of the example automatic ball machine shown in FIG. 1, in accordance with at least one configuration disclosed herein.
Figure 8:
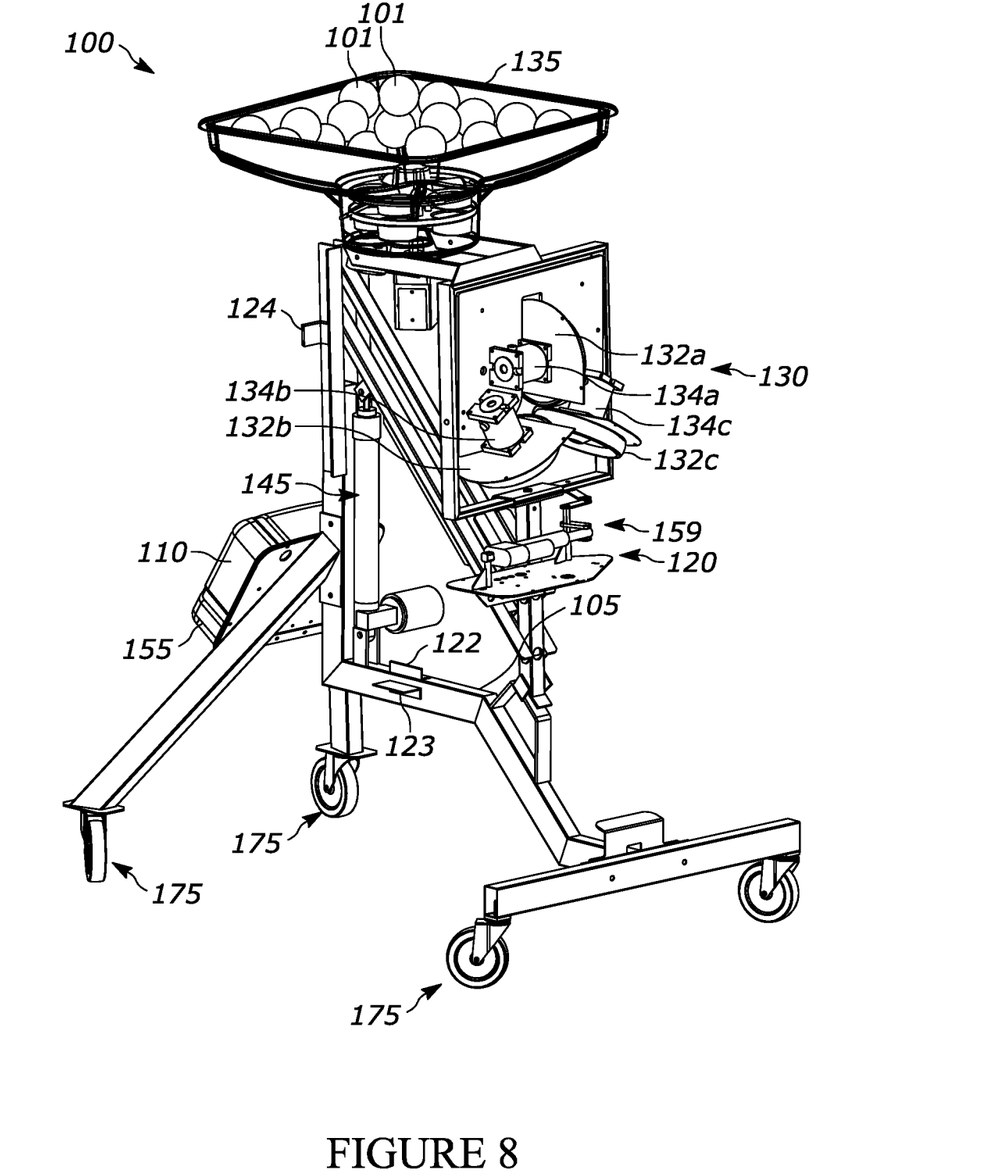
FIG. 8 illustrates another isometric view of the example automatic ball machine shown in FIG. 1, in accordance with at least one configuration disclosed herein.
Figure 9:
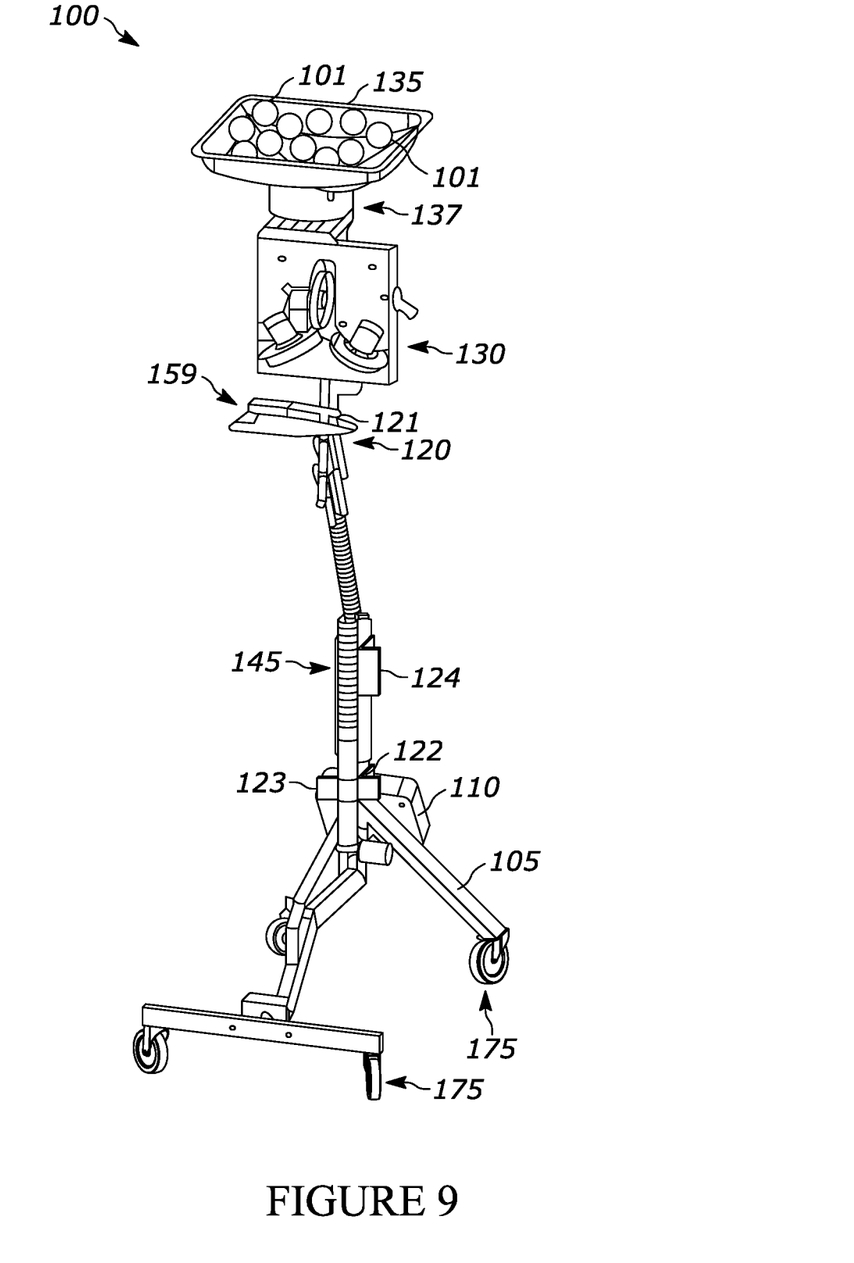
FIG. 9 illustrates another isometric view of the example automatic ball machine shown in FIG. 1, shown in a raised position, in accordance with at least one configuration disclosed herein.
Figure 10:
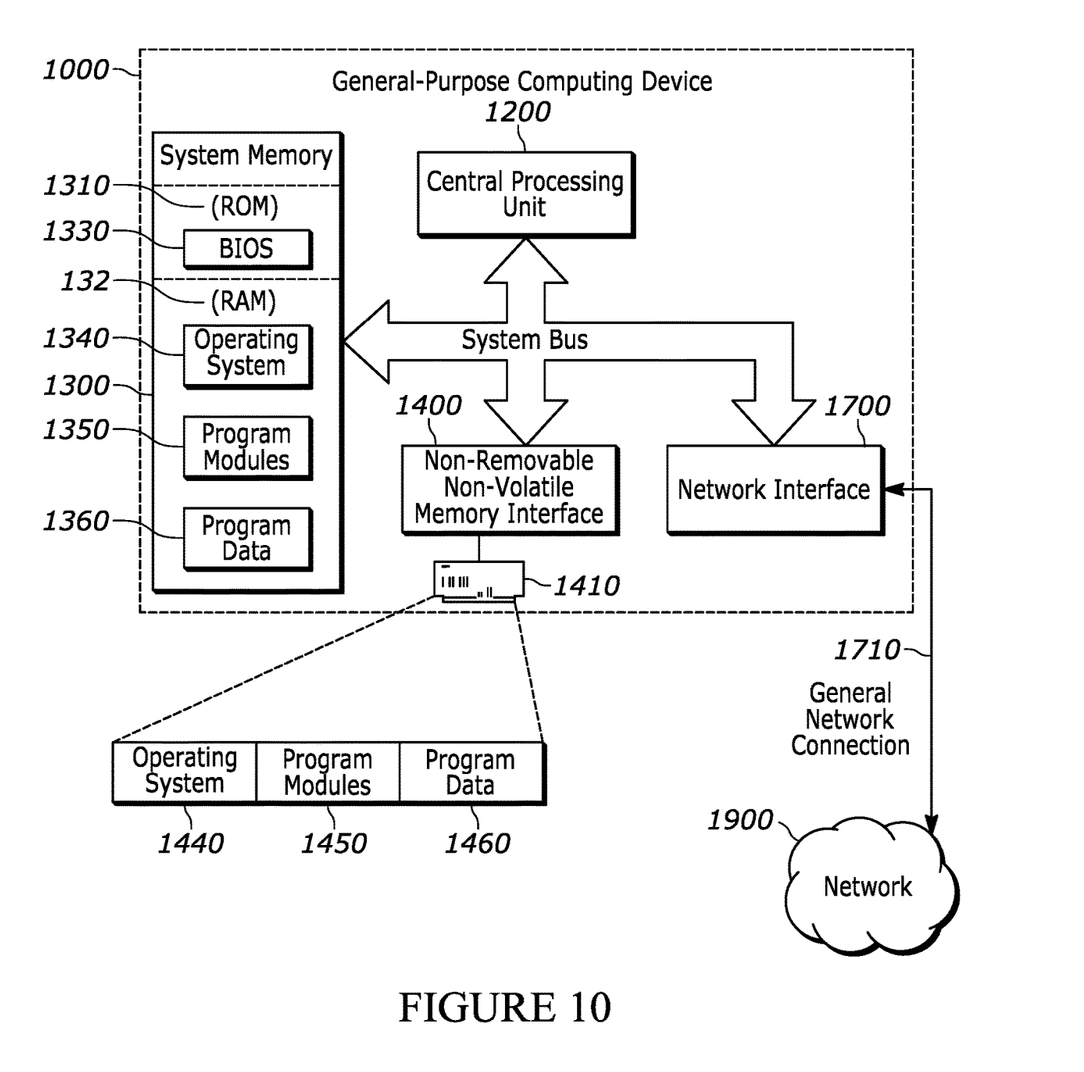
FIG. 10 shows an example general-purpose computing device for use with the ball machine, in accordance with at least one configuration disclosed herein.

With reference to FIG. 10, an exemplary general-purpose computing device is illustrated in the form of the exemplary general-purpose computing device 1000. The general-purpose computing device 1000 may be of the type utilized for the controller 110 (FIGS. 1-9) as well as the other computing devices with which the controller 110 may communicate through a communication network 1900. As such, it will be described with the understanding that variations can be made thereto. The exemplary general-purpose computing device 1000 can include, but is not limited to, one or more central processing units (CPUs) 1200, a system memory 1300, such as including a Read Only Memory (ROM) 1310 to store a Basic Input/Output System (BIOS) 1330 and a Random Access Memory (RAM) 1320, and a system bus 1210 that couples various system components including the system memory to the CPU(s) 1200. The system bus 1210 may be any of several types of bus structures including a memory bus or memory controller, a peripheral bus, and a local bus using any of a variety of bus architectures. Depending on the specific physical implementation, one or more of the CPUs 120, the system memory 1300 and other components of the general-purpose computing device 1000 can be physically co-located, such as on a single chip. In such a case, some or all of the system bus 1210 can be nothing more than communicational pathways within a single chip structure and its illustration in FIG. 10 can be nothing more than notational convenience for the purpose of illustration.

The general-purpose computing device 1000 also typically includes computer readable media, which can include any available media that can be accessed by the general-purpose computing device 1000. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 1000. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 1000 may operate in a networked environment via logical connections to one or more remote computers. The logical connection depicted in FIG. 10 is a general network connection 1710 to the network 1900, which can be a local area network (LAN), a wide area network (WAN) such as the Internet, or other networks. The computing device 1000 is connected to the general network connection 1710 through a network interface or adapter 1700 that is, in turn, connected to the system bus 1210. In a networked environment, program modules depicted relative to the general-purpose computing device 1000, or portions or peripherals thereof, may be stored in the memory of one or more other computing devices that are communicatively coupled to the general-purpose computing device 1000 through the general network connection 1710. It will be appreciated that the network connections shown are exemplary and other means of establishing a communications link between computing devices may be used.

The general-purpose computing device 1000 may also include other removable/non-removable, volatile/nonvolatile computer storage media. By way of example only, FIG. 10 illustrates a hard disk drive 1410 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 1410 is typically connected to the system bus 1210 through a non-removable memory interface such as interface 1400.

The drives and their associated computer storage media discussed above and illustrated in FIG. 10, provide storage of computer readable instructions, data structures, program modules and other data for the general-purpose computing device 1000. In FIG. 10, for example, hard disk drive 1410 is illustrated as storing operating system 1440, other program modules 1450, and program data 1460. Note that these components can either be the same as or different from operating system 1340, other program modules 1350 and program data 1360, stored in RAM 1320. Operating system 1440, other program modules 1450 and program data 1460 are given different numbers here to illustrate that, at a minimum, they are different copies.

With reference to FIGS. 1-9, again, the foregoing description applies to the controller 110, as well as to any other computing devices in communication with the controller 110 through the network 1900. The network interface 1700 facilitates outside communication in the form of voice and/or data. For example, the network interface 1700 may include a connection to a Plain Old Telephone Service (POTS) line, or a Voice-over-Internet Protocol (VOIP) line for voice communication. In addition, the network interface 1700 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 1700 is not limited to any particular protocol or type of communication. It is, however, preferred that the network interface 1700 be configured to transmit data bi-directionally, through at least one mode of communication. The more robust the structure of communication, the more manners in which to avoid a failure or a sabotage with respect to communication, such as to collect healthcare information in a timely manner.

The program modules 1450 comprises a user interface which can configure the ball machine 100. In many instances, the program modules 1450 comprises a keypad with a display that is connected through a wired/wireless connection with the controller 110. Of course, with the different communication protocols associated with the network interface 1700, the program modules 1450 may comprise a wireless device that communicates with the CPUs 1200 through a wireless communication protocol (i.e., Bluetooth, RF, WIFI, etc.). In other configurations, the program modules 1450 may comprise a virtual programming module in the form of software that is on, for example, a smartphone, in communication with the network interface 1700. In still other configurations, such a virtual programming module may be located in the cloud (or web based), with access thereto through any number of different computing devices. Advantageously, with such a configuration, the user 102 can communicate with the ball machine 100 remotely, with the ability to change functionality.

Figure 11:
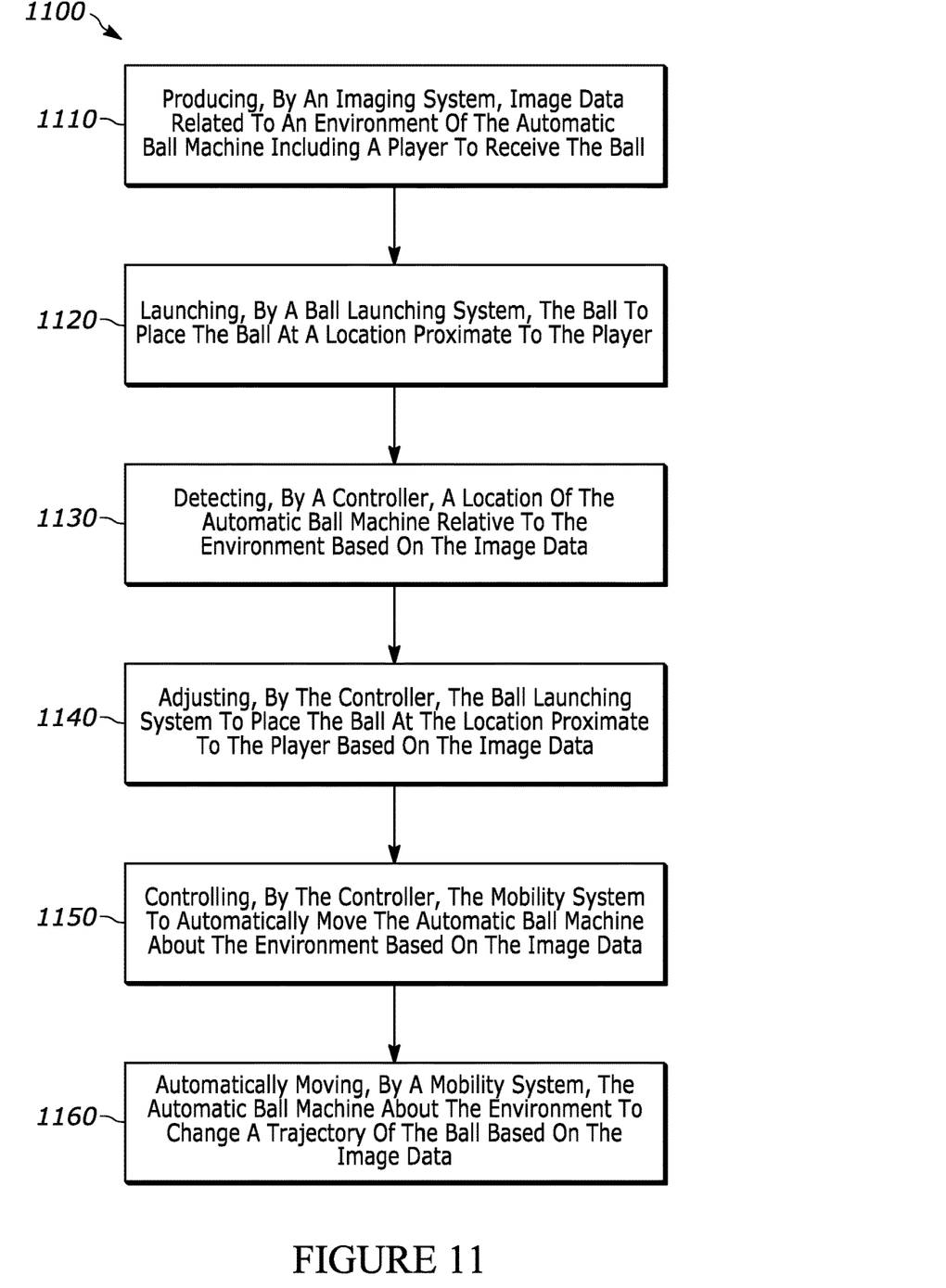
FIG. 11 shows an example flowchart for a method that can be performed by the example automatic ball machine, in accordance with at least one configuration disclosed herein.

With reference to FIG. 11, a flowchart is shown for a method 1100 that can be performed by the example automatic ball machine 100. The method 1100 can include process 1110 that produces, by the imaging system 120, image data related to an environment of the automatic ball machine 100. This image data can include the player 102 to receive the ball 101. The process 1110 can proceed to a process 1120.

The method 1100 can further include the process 1120 that launches, by the ball launching system 130, the ball 101 to place the ball 101 at a location proximate to the player 102. The process 1120 can proceed to a process 1130.

The method 1100 can further include a process 1130 that detects, by the controller 110 coupled to the frame 105, a location of the automatic ball machine 100 relative to the environment based on the image data. The process 1110 can proceed to a process 1120. The process 1130 can proceed to a process 1140.

The method 1100 can further include a process 1140 that adjusts, by the controller 110, the ball launching system 130 to place the ball 101 at the location proximate to the player 102 based on the image data. The process 1140 can proceed to a process 1150.

The method 1100 can further include a process 1150 that controls, by the controller 110, the mobility system 175 to automatically move the automatic ball machine 100 about the environment based on the image data. The process 1150 can proceed to a process 1160.

The method 1100 can further include a process 1160 that automatically moves, by the mobility system 175, the automatic ball machine 100 about the environment to change a trajectory of the ball 101 based on the image data.

Although the processes 1110-1160 are consecutively numbered, such is not an indication of an order in which the processes 1110-1160 are performed, with the automatic ball machine 100 being able to perform the processes 1110-1160 in any order. Moreover, in at least one configuration the method 1100 can further include any of the other processes discussed above.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An automatic ball machine, comprising:
    an imaging system to produce image data related to an environment of the automatic ball machine including a player;
    a ball launching system to launch balls to locations proximate to the player;
    and
    a controller configured to
        detect a location of the automatic ball machine relative to the environment based on the image data,
        perform a first adjustment of parameters of the ball launching system to launch a first ball to a first location proximate to the player based on the image data including the player,
        control the ball launching system to launch the first ball, based on the first adjusted parameters, to the first location,
        detect a second location of the first ball after launching the first ball,
        determining, as a location error, a difference between the second location and the first location, and
        perform a second adjustment of parameters of the ball launching system to reduce the location error with respect to a subsequently launched second ball.

2. The automatic ball machine according to claim 1, wherein the imaging system includes at least one of a first camera facing in a direction that the balls are launched, a second camera facing in a direction to a left of the launch direction, a third camera facing to a right of the launch direction, and a fourth camera facing to away from the launch direction.

3. The automatic ball machine according to claim 1, wherein the ball launching system includes first, second, and third spinner wheels coupled to first, second, and third spinner motors, and wherein the parameters of the ball launching system includes a speed of one or more of the first, second, and third spinner wheels.

4. The automatic ball machine according to claim 1, further comprising an environmental sensor to detect objects in a direction that the balls are being launched, the controller further to monitor an area in the direction that the balls are being launched and to stop the ball launching system from launching the balls to prevent an object from being struck by the balls.

5. The automatic ball machine according to claim 4, wherein the environmental sensor is LiDAR.

6. The automatic ball machine according to claim 1, wherein the controller is further configured to receive at least one user serve preference and location on a court, calculate serving parameters based on the at least one user serve preference and location on the court, and adjust the ball launching system based on the at least one user serve preference and location on the court.

7. The automatic ball machine according to claim 1, further comprising:
an orientation sensor to detect an orientation of the balls; and
an orientation adjuster to rotate the balls.

8. The automatic ball machine according to claim 1, further comprising a height actuator to adjust a height of the ball launching system.

9. The automatic ball machine according to claim 1, further comprising a hopper to store a quantity of balls prior to launch.

10. The automatic ball machine according to claim 9, further comprising a ball feeder to control, via the controller, feeding of the balls to the ball launching system.

11. A method of operating an automatic ball machine, the method comprising:
producing, by an imaging system, image data related to an environment of the automatic ball machine including a player;
launching, by a ball launching system, a first ball to place the first ball at a first location proximate to the player;
detecting, by a controller, a location of the automatic ball machine relative to the environment based on the image data;
performing, by the controller, a first adjustment of parameters of the ball launching system to launch the first ball to the first location proximate to the player based on the image data including the player;
controlling, by the controller, the ball launching system to launch the first ball, based on the first adjusted parameters, to the first location;
detecting, by the controller, a second location of the first ball after launching the first ball;
determining, by the controller, as a location error, a difference between the second location and the first location; and
performing, by the controller, a second adjustment of parameters of the ball launching system to reduce the location error with respect to a subsequently launched second ball.

12. The method according to claim 11, wherein the imaging system includes at least one of a first camera facing in a direction that the first ball and the second ball are launched, a second camera facing in a direction to a left of the launch direction, a third camera facing to a right of the launch direction, and a fourth camera facing to away from the launch direction.

13. The method according to claim 11, wherein the ball launching system includes first, second, and third spinner wheels coupled to first, second, and third spinner motors, and
wherein the parameters of the ball launching system includes a speed of one or more of the first, second, and third spinner wheels.

14. The method according to claim 11, further comprising:
detecting, by an environmental sensor, objects in a direction that the first ball and the second ball are being launched;
monitoring, by the controller, an area in the direction that the first ball and the second ball are being launched; and
stopping, by the controller, the ball launching system from launching the first ball and the second ball to prevent an object from being struck by launched balls.

15. The method according to claim 14, wherein the environmental sensor is a Light Detection and Ranging (LiDAR) sensor.

16. The method according to claim 11, further comprising:
receiving, by the controller, at least one of user serve preference and location on a court;
calculating, by the controller, serving parameters based on the at least one user serve preference and location on the court; and
adjusting, by the controller, the ball launching system based on the at least one user serve preference and location on the court.

17. The method according to claim 11, further comprising:
detecting, by an orientation sensor, an orientation of the first ball and the second ball; and
rotating, by an orientation adjuster, the first ball and the second ball.

18. The method according to claim 11, further comprising adjusting, by a height actuator, a height of the ball launching system.

19. The method according to claim 11, further comprising storing, by a hopper, a quantity of balls prior to launch.

20. The method according to claim 19, further comprising controlling, via the controller, a ball feeder to feed the balls to the ball launching system.

\* \* \* \* \*